Aug. 7, 1945.  G. F. ROQUEMORE  2,381,186
RUBBER-TO-METAL ADHESION
Filed Nov. 3, 1942

Inventor
Glen F. Roquemore

By
Attorney

Patented Aug. 7, 1945

2,381,186

UNITED STATES PATENT OFFICE 2,381,186

RUBBER-TO-METAL ADHESIONS

Glen F. Roquemore, Akron, Ohio, assignor to Wingfoot Corporation, Akron, Ohio, a corporation of Delaware Application November 3, 1942, Serial No. 464,424

2 Claims. (Cl. 154—43)

This invention relates to rubber-to-metal adhesions.

In the past, many attempts have been made to find a satisfactory adhesive for bonding rubber to metals, such as aluminum, steel, brass, copper, nickel, cadmium, etc. Rubber adheres to brass, copper, nickel, and cadmium more readily than to aluminum and steel. However, the bonding of rubber to any of these materials has presented a problem. Although various bonding agents have been used, the search is still being continued for a satisfactory bonding material which does not become plastic at temperatures of 200° C. or above after the bond has been formed.

Figure 1:
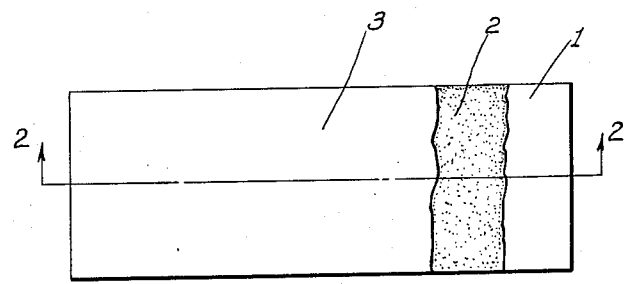
Figure 2:
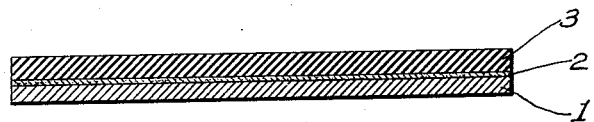

This invention relates to the formation of such a strong bond which remains strong when heated. The invention includes the bonded materials as well as the process of producing them. In the accompanying drawing, Fig. 1 is a plan view of a laminated structure, illustrating the invention, in which a portion of the structure is cut away to show the various layers therein. Fig. 2 is a section along the line 2—2 in Fig. 1.

Referring to the drawing, 1 is a layer of metal to which a layer of rubber 3 is bonded by means of a bonding layer 2.

According to this invention, rubber is united to metal by an adhesive which is composed to a large extent of cyclized rubber to which a diisocyanate has been added. The cyclized rubber may be one of the Pliolite products manufactured by The Goodyear Tire & Rubber Company and formed by cyclizing rubber, using tin tetrachloride or chlorostannic acid or the like as the cyclizing agent. The adhesive may be any other cyclized rubber, such as that produced by treating rubber with a phenol sulphonic acid to produce compounds as those known in the trade as Thermoprene and Vulcalock (both manufactured by B. F. Goodrich Company, Akron, Ohio), Marbon B (manufactured by Marbon Corporation of Gary, Indiana, apparently according to U. S. 2,230,359), etc. Any cyclized rubber adhesive composition containing an organic diisocyanate may be used.

Any organic diisocyanate, either aliphatic or aromatic, may be used according to this invention. Examples are para phenylene diisocyanate, meta phenylene diisocyanate, the diphenylene diisocyanates, methylene di(para phenylene isocyanate), ethylene di(oxy trimethylene isocyanate), and the diisocyanates of other glycol ethers, the diisocyanates of propyl ethers, toluylene diisocyanates, the dimethyl phenylene diisocyanates, the naphthyl diisocyanates, the diisocyanates of dioxane, hexamethylene diisocyanate, etc. These diisocyanates may be prepared by treating a solution of the corresponding diamine with an excess of hydrogen chloride and then introducing phosgene into the resulting mixture of precipitated amine hydrochloride, and solvent.

In preparing the adhesive composition about 20 to 30 parts by weight of a diisocyanate, such as methylene di(para phenylene isocyanate), per 100 parts of the cyclized rubber will give good results. For example, in an adhesive composition containing 20 parts by weight of a milled Pliolite resin and 80 per cent of a solvent, such as benzol or gasoline, the percentage of the organic diisocyanate may be as low as 10 per cent or as high as 40 per cent or higher based on the solids content of the adhesive. In one instance the addition of 30 per cent of a diisocyanate was found to practically double the adhesion at 200° F. Even less than 10 per cent of the diisocyanate gives improved adhesions.

The rubber is first compounded with vulcanizing ingredients. Then either the surface of the unvulcanized slab of rubber or the surface of the metal or both are treated with the cyclized rubber adhesive containing the diisocyanate. The cyclized rubber may be alone or it may contain other compounding ingredients, such as plasticizers, etc. A satisfactory coating composition has the following formula:

| | Parts |
|---|---|
| Rubber | 100 |
| Mercaptobenzothiazole | 0.75 |
| Sulfur | 2.8 |
| Stearic acid | 3.0 |
| Pine tar | 3.0 |
| Phenyl beta naphthylamine | 1.0 |
| Zinc oxide | 5.0 |
| Carbon black | 50.0 |

What I claim is:

1. An article comprising a rubber part and a metal part and, therebetween, a bonding layer comprising a major proportion of a cyclized rubber adhesive and a minor proportion of an organic diisocyanate.

2. An article comprising a rubber part and a metal part and, therebetween, a bonding layer comprising a major proportion of a cyclized rubber adhesive and a minor proportion of methylene di(paraphenylene isocyanate).

GLEN F. ROQUEMORE.